Patented Oct. 18, 1949

2,485,227

UNITED STATES PATENT OFFICE 2,485,227

METHOD OF OBTAINING A CRYSTALLINE SODIUM PENICILLIN

Oskar Wintersteiner, New Brunswick, N. J., and Max Adler, New York, N. Y., assignors to E. R. Squibb & Sons, New York, N. Y., a corporation of New York No Drawing. Application June 15, 1944, Serial No. 540,543

4 Claims. (Cl. 260—302)

This invention relates to the potent bacteriostatic and/or bactericidal agents formed during the growth processes of various strains of the mold *Penicillium notatum*.

In 1929, Fleming discovered that a strain of a *Penicillium* mold growing in ordinary nutrient broth formed a powerful antibacterial substance, which he named "penicillin" (Brit. J. Exptl. Path. 10, 226–36); and this name was later applied to the product obtained by Florey and his associates at the University of Oxford, by the stationary, surface-pad growth of *Penicillium notatum* on shallow layers of media, and shown by them to be a clinically-useful chemotherapeutic agent (Lancet 239, 226, 236, 1940; and Lancet 241, 177, 1941).

More recently, it was found advantageous to grow the mold *Penicillium notatum* in submerged culture, i. e., to incubate the mold while it is submerged in a liquid nutrient medium and the latter is aerated, by agitation or otherwise (Foster and McDaniel application, Serial No. 487,140, filed May 15, 1943, now Patent No. 2,448,790, dated September 7, 1948); and the product thus obtained (with a medium comprising corn steep liquor) is at present commonly called "sodium-penicillin" (or, often, merely "penicillin").

It is now realized that more than one chemical entity has been identified by the specific name "penicillin." Thus, the crystalline product derived, as described hereinafter, from a "sodium-penicillin" obtained by growing *Penicillium notatum* in submerged culture in a synthetic medium in which has been included sodium sulfite (as described in McCormack application Serial No. 519,207, filed January 21, 1944, now Patent No. 2,437,918, dated March 16, 1948) has the empirical formula $C_{14}H_{19}O_4N_2SNa$; while the crystalline product heretofore derived (as described in Wintersteiner and MacPhillamy application Serial No. 497,719, filed August 6, 1943, which has become abandoned, and the continuation-in-part thereof, Serial No. 540,140, filed June 13, 1944, now Patent No. 2,461,949, dated February 15, 1949) from the product obtained by submerged culture with a medium comprising corn steep liquor, has the empirical formula $$C_{16}H_{17}O_4N_2SNa$$

To prevent further confusion, therefore, the former (sodium sulfite) "penicillin" has been named (and will hereinafter be referred to as) penicillin F, while the latter (corn steep) "penicillin" has been named (and will hereinafter be referred to as) penicillin G; and these names have now been adopted by the chemical research groups working in this field in this country.

Though the sodium-penicillin F heretofore obtained (e. g., that obtained as described in the aforementioned McCormack application) is an exceptionally effective chemotherapeutic (antibiotic) agent, the therapeutic utility thereof is impaired by the impurities present, and its consequent instability on storage.

It is the object of this invention to provide a method of purifying sodium-penicillin F, especially sodium-penicillin F obtained by growing the mold in submerged culture in a synthetic medium in which has been included an inorganic, water-soluble sulfite-type compound; and a further object is to provide crystalline sodium-penicillin F, and a method of obtaining it; and a still further object is to provide highly-active, substantially-pure, acid-penicillin F and derivatives thereof.

In the practice of this invention, high-potency sodium-penicillin F is purified by dissolving it in an aqueous water-miscible organic solvent of medium polarity, such as aqueous acetone, passing the solution through a chromatographic adsorption column, and recovering sodium-penicillin F from the lower zones of the column (by elution with a substantially-neutral aqueous buffer solution). From this partially-purified sodium-penicillin F (or a comparable sodium-penicillin F otherwise obtained), crystalline sodium-penicillin F may be obtained by crystallization from an aqueous lower alkyl ester of a lower fatty acid; and the product may be recrystallized by dissolving it in the minimum volume of an aqueous water-miscible organic solvent of medium polarity, and adding many volumes of a dry lower alkyl ester of a lower fatty acid.

The water-miscible organic solvents of medium polarity utilizable in the practice of this invention comprise, inter alia, the lower-aliphatic ketones (e. g., acetone, methyl ethyl ketone, and diethyl ketone) and the cyclic ethers (e. g., dioxane), the preferred solvent being acetone. The preferred solvent for the crystallization of sodium-penicillin F is aqueous ethyl acetate.

The following examples are illustrative of the invention (the potency unit referred to being the Florey or Oxford unit used in the United States of America for standardizing therapeutic preparations of penicillin as prescribed by the U. S. Food and Drug Administration):

(a) 5 g. of the partially-purified sodium-penicillin F obtained as described in Example 15 of the aforementioned McCormack application (possessing a potency of 600 units/mg., a specific rotation $[\alpha]_D$ of $+136°$ in water, and a sulfur content of 4.74%) is dissolved in 60 cc. 95% acetone, and the solution is passed through a 2.5 x 50 cm. column of alumina (which has been washed with dilute sulfuric acid and water until the washings have a pH of 4–5, dried, and heated at 150° C. for 48 hours). After all of the solute has been adsorbed, the chromatogram is developed by washing the column with 95% acetone until it has the following appearance; a narrow, dark-brown band (I) at the top of the column; below this, a light-brown zone (II) extending downward to about ⅓ of the length of the column; below this, a light-yellow zone (III) extending downward to about ¾ the length of the column; and below this, a light-yellow band, then a very faintly yellow zone (IV) extending to almost the bottom of the column, and terminating in another light-yellow band. The washing with acetone is discontinued after the latter band has passed into the filtrate.

The acetone washings contain very little activity and are discarded. The column is sucked dry with an air current, and the various sections indicated above are separated. Band I contains very little activity and is discarded. Zone II is eluted with a pH 7 phosphate buffer solution, yielding material of comparatively low potency. Zones III and IV are combined and eluted with a pH 7 phosphate buffer solution; and the penicillin F contained in this solution is recovered as the sodium salt by acidifying the ice-cooled buffer solution with 10% phosphoric acid to pH 2–3, extracting three times with ether, washing the combined ether extracts with water, re-extracting with small portions of 1% aqueous sodium bicarbonate solution until the pH of the last extract is 6.5, freezing the combined aqeous extracts, and subjecting the frozen material to a high vacuum to sublime out the water. The thus-purified sodium-penicillin F weighs 1.5 g., has a potency of 1030 units/mg., and has a specific rotation $[\alpha]_D$ of $+258°$. (Similar treatment of the zone II eluate yields 0.6 g. of a salt having a potency of 83 units/mg., which may be combined with the same fraction from other batches and rechromatographed.)

(b) 226 mg. of the sodium-penicillin F obtained as decsribed in section (a)—or a sodium-penicillin F of comparable purity otherwise obtained—is dissolved in 2.5 cc. dry ethyl acetate, and the very small amount of dark flocculent matter remaining undissolved is removed by centrifuging. A very small quantity of water, just sufficient to cause a faint turbidity, is added to the supernatant, the solution is allowed to stand for an hour at room temperature (the turbidity increasing slightly), and then chilled in the refrigerator. In the course of two hours, white, needle-like crystals begin to form; and after standing 12–16 hours in the refrigerator, the crystalline material is filtered off, washed several times with dry ethyl acetate, and dried over calcium chloride in vacuo. (The yield of crystalline product is 70 mg.; and an additional yield of 41 mg. is obtained from the combined filtrate and washings after it has been in the refrigerator for several days.)

The product, crystalline sodium-penicillin F, is hygroscopic when freely exposed to the atmosphere (losing about 1% of its weight on drying at 100° in vacuo for 2 hours), and melts at 204–205° C. with decomposition in a capillary tube inserted into the melting-point block at 160° C. It has the empirical formula $C_{14}H_{19}O_4N_2SNa$ (a product, dried in vacuo at 100° C. for 2 hours, giving the following figures on analysis: C, 50.27; H, 5.67; N, 8.43; S, 9.39; and Na, 6.95; while the calculated analysis for $C_{14}H_{19}O_4N_2SNa$ is: C, 50.27; H, 5.73; N, 8.38; S, 9.59; and Na, 6.88), the specific rotation $[\alpha]_D^{23}$ of $+290°$ in water, and a potency of 1350 units/mg. The ultraviolet absorption curve of the product shows merely end absorption beginning at 2500 Å. and reaching an E value of 3000 at 2250 Å. (the low maxima at 2630, 2570, and 2520 Å. evident in the spectrum of crystalline sodium penicillin G being absent). On degradation of the product by hydrolysis with boiling 0.1 normal sulfuric acid and subsequent treatment with mercuric chloride and filtration, an aldehyde of the formula $C_8H_{13}O_2N$ is obtained in the filtrate, and may be isolated in the form of its 2,4-dinitro-phenylhydrazone of the formula $C_{14}H_{17}O_5N_5$ melting at 179° C.

Crystalline sodium-penicillin F, dried in vacuo at 100° C. for 2 hours, is fully as active as the undried material, while impure preparations of sodium-penicillin F lose most of their activity under these conditions.

The crystalline sodium-penicillin F obtained as described hereinbefore may be recrystallized by dissolving it in the minimum volume of 98% acetone required for solution, and adding 5 volumes of dry ethyl acetate. On recrystallization thus three times, the product has the specific rotation $[\alpha]_D^{23}$ of $+316.5°$ in water and a potency of 1425 units/mg.

The structural formula of sodium-penicillin F is $$CH_3CH_2CH=CHCH_2-\underset{\underset{O}{\|}}{C}-NH-CH-CH\underset{\underset{\underset{O}{\|}}{\underset{C-N}{|}}-CH-COONa}{\overset{S}{\diagup}\underset{\diagdown}{\overset{\diagdown}{C}}\overset{CH_3}{\diagup}\overset{\diagdown}{CH_3}}$$

alternatively, the purified sodium-penicillin F obtained as described in section (a) may be crystallized by dissolving it in a volume of water-saturated ethyl acetate just sufficient for solution, and chilling and further treating the solution as described hereinbefore.

The crystalline sodium-penicillin F obtained in accordance with this invention may be used advantageously for the preparation of highly-active, substantially-pure acid-penicillin F and derivatives thereof. Thus, such acid-penicillin F, having the empirical formula $C_{14}H_{20}O_4N_2S$, may be obtained by acidifying an aqueous solution of the crystalline sodium-penicillin F with a 10% solution of phosphoric acid, extracting the aqueous solution with ether, drying the ether extract, and removing the solvent in vacuo. From this acid-penicillin F, various highly-active, substantially-pure derivatives may be obtained, inter alia, esters and other salts. For example, a calcium salt may be obtained by dissolving the acid-penicillin F in ether, extracting the ether with small portions of aqueous $Ca(OH)_2$ or with an aqueous suspension of $CaCO_3$, and removing the water in vacuo; and the esters may be obtained by treating a dry ether solution of the acid-penicillin F with a diazoalkane, e. g., diazomethane. In the foregoing procedures, all treatments involving acid solutions (acid-penicillin F) are, of course, carried out at low temperature, e. g., while cooling with ice.

The invention may be variously otherwise embodied within the scope of the appended claims.

We claim:

1. In the method of obtaining a crystalline sodium-penicillin of the type characterized by the structural formula

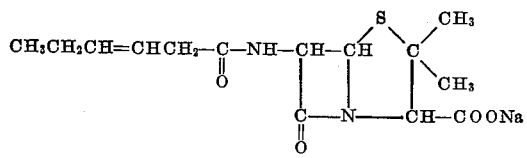

the step of crystallizing an amorphous high-potency sodium-penicillin of such type from an aqueous lower alkyl ester of a lower fatty acid.

2. In the method of obtaining a crystalline sodium-penicillin of the type characterized by the structural formula

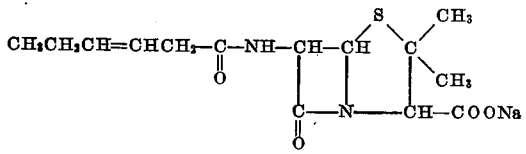

the step of crystallizing an amorphous high-potency sodium-penicillin of such type from aqueous ethyl acetate.

3. In the method of obtaining a crystalline sodium-penicillin of the type characterized by the structural formula

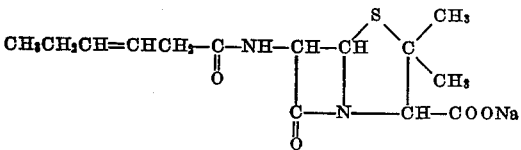

the steps of crystallizing an amorphous high-potency sodium-penicillin of such type from an aqueous lower alkyl ester of a lower fatty acid, dissolving the crystalline product in a minimum volume of an aqueous water-miscible organic solvent of the group consisting of lower-aliphatic ketones and cyclic ethers, and adding a sufficient quantity of a substantially dry lower alkyl ester of a lower fatty acid to cause crystallization.

4. In the method of obtaining a crystalline sodium-penicillin of the type characterized by the structural formula

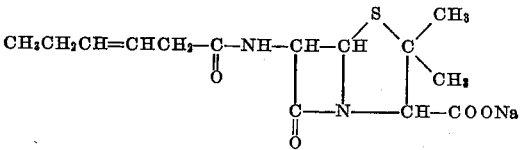

the steps of crystallizing an amorphous high-potency sodium-penicillin of such type from an aqueous lower alkyl ester of a lower fatty acid, dissolving the crystalline product in a minimum volume of aqueous acetone, and adding a sufficient quantity of substantially dry ethyl acetate to cause crystallization.

OSKAR WINTERSTEINER.
MAX ADLER.

REFERENCES CITED

The following references are of record in the file of this patent:

UNITED STATES PATENTS

| Number | Name | Date |
|---|---|---|
| 2,399,840 | Wachtel | May 7, 1946 |
| 2,437,918 | McCormack | Mar. 16, 1948 |

OTHER REFERENCES

Lancet II, pp. 177–188, Aug. 16, 1941.
Abraham: British Journal of Experimental Pathology, vol. 23, June 1942, pp. 103–125.
Science, July 3, 1942, pp. 20 and 21.
Manufacturing Chemist and Manufacturing Perfumer, Aug. 1943, XIV, pp. 251–254.
J. Am. Med. Assoc., p. 736, July 7, 1945.
Separation and Identification of Penicillin Species in Commercial Penicillins (Q. 176) Culture, by Salivar (Feb. 1, 1947).